US007992014B2

(12) United States Patent
Langgood et al.

(10) Patent No.: US 7,992,014 B2
(45) Date of Patent: Aug. 2, 2011

(54) ADMINISTERING POWER SUPPLIES IN A DATA CENTER

(75) Inventors: John K. Langgood, Cary, NC (US); Thomas F. Lewis, Raleigh, NC (US); Kevin M. Reinberg, Chapel Hill, NC (US); Kevin S. D. Vernon, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 11/960,450

(22) Filed: Dec. 19, 2007

(65) Prior Publication Data
US 2009/0164824 A1    Jun. 25, 2009

(51) Int. Cl.
G06F 1/26 (2006.01)
G06F 1/28 (2006.01)
G06F 1/30 (2006.01)
G06F 1/18 (2006.01)

(52) U.S. Cl. ........ 713/300; 713/310; 713/320; 713/321; 713/323; 713/324; 713/330; 713/340; 700/22; 700/292; 700/295

(58) Field of Classification Search .................. 713/300, 713/310, 320–324, 330, 340; 700/22, 292, 700/295
See application file for complete search history.

(56) References Cited

U.S. PATENT DOCUMENTS

| 4,996,646 | A | 2/1991 | Farrington |
| 5,638,296 | A | 6/1997 | Johnson et al. |
| 5,719,800 | A | 2/1998 | Mittal et al. |
| 5,892,449 | A | 4/1999 | Reid et al. |
| 6,335,852 | B1 | 1/2002 | Nimmo |
| 6,577,963 | B1 | 6/2003 | Cordray et al. |
| 6,804,101 | B2 | 10/2004 | Tignor et al. |
| 6,985,784 | B2 | 1/2006 | Vandevanter et al. |
| 7,069,463 | B2 | 6/2006 | Oh |

(Continued)

FOREIGN PATENT DOCUMENTS

CN    1622218 A    6/2005

(Continued)

OTHER PUBLICATIONS

Office Action, U.S. Appl. No. 11/854,298, mailed May 25, 2010.

(Continued)

*Primary Examiner* — Thomas Lee
*Assistant Examiner* — Fahmida Rahman
(74) *Attorney, Agent, or Firm* — H. Barrett Spraggins; Cynthia G. Seal; Biggers & Ohanian, LLP

(57) ABSTRACT

Administering power supplies in a data center including, upon connection of a first power supply through a power line to a circuit breaker in the data center, querying, by a power supply communications device of the first power supply through the power line, a circuit breaker communications device of the circuit breaker for a circuit breaker identification; querying, by the power supply communications device of the first power supply, for a maximum current threshold for the circuit breaker; sending the circuit breaker identification and the maximum current threshold for the circuit breaker to a management module; and determining, by the management module in dependence upon the circuit breaker identification and the maximum current threshold for the circuit breaker, whether to power on a computing device powered by the first power supply including determining whether the circuit breaker is shared by another power supply.

19 Claims, 5 Drawing Sheets

U.S. PATENT DOCUMENTS

| | | | |
|---|---|---|---|
| 7,131,012 B2 * | 10/2006 | Egan et al. | 713/300 |
| 7,151,329 B2 | 12/2006 | Andarawis et al. | |
| 7,240,225 B2 | 7/2007 | Brewer et al. | |
| 7,269,753 B2 | 9/2007 | Farkas et al. | |
| 7,444,526 B2 | 10/2008 | Felter et al. | |
| 7,525,782 B1 * | 4/2009 | Hedrick et al. | 361/93.2 |
| 7,581,130 B2 | 8/2009 | Carroll et al. | |
| 7,634,667 B2 * | 12/2009 | Weaver et al. | 713/300 |
| 7,827,421 B2 | 11/2010 | Brewer et al. | |
| 2003/0048589 A1 | 3/2003 | Tignor et al. | |
| 2003/0056125 A1 | 3/2003 | O'Conner et al. | |
| 2003/0085624 A1 | 5/2003 | Kadoi et al. | |
| 2004/0148060 A1 | 7/2004 | Lee | |
| 2004/0177283 A1 | 9/2004 | Madany et al. | |
| 2005/0086544 A1 | 4/2005 | Egan et al. | |
| 2005/0102544 A1 | 5/2005 | Brewer et al. | |
| 2006/0044117 A1 * | 3/2006 | Farkas et al. | 340/310.11 |
| 2006/0253715 A1 | 11/2006 | Ghiasi et al. | |
| 2007/0271477 A1 | 11/2007 | Brewer et al. | |
| 2008/0040623 A1 | 2/2008 | Sone | |
| 2008/0082276 A1 * | 4/2008 | Rivers et al. | 702/62 |
| 2008/0301279 A1 | 12/2008 | Brey et al. | |
| 2009/0089595 A1 | 4/2009 | Brey et al. | |
| 2009/0132842 A1 | 5/2009 | Brey et al. | |
| 2009/0217073 A1 | 8/2009 | Brech et al. | |
| 2009/0282274 A1 | 11/2009 | Langgood et al. | |

FOREIGN PATENT DOCUMENTS

| | | |
|---|---|---|
| CN | 1835166 A | 9/2006 |

OTHER PUBLICATIONS

Office Action, U.S. Appl. No. 11/854,298, mailed Nov. 9, 2010.

Office Action, U.S. Appl. No. 12/121,198, mailed Dec. 14, 2010.

Notice of Allowance, U.S. Appl. No. 12/118,095, mailed Dec. 2, 2010.

Office Action, U.S. Appl. No. 12/121,253, mailed Dec. 15, 2010.

* cited by examiner

ADMINISTERING POWER SUPPLIES IN A DATA CENTER

BACKGROUND OF THE INVENTION

1. Field of the Invention

The field of the invention is data processing, or, more specifically, methods, apparatus, and products for administering power supplies in a data center.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago. Different computer systems today often require different amounts of current. Power supplies supplying such current are typically connected to a circuit breaker that protects the devices connected to the circuit breaker. Different circuit breakers have different current ratings. In data centers today, for example, a number of power supplies may be connected to a number of different circuit breakers, each having a different current rating. In such data centers it is not always apparent which power socket that a power supply plugs into is connected to which circuit breaker. One current solution is for the power sockets to be labeled with a breaker identification and current rating information for the breaker. In many cases however, this manual labeling of power sockets is ambiguous and not continually administered such that the labels are meaningfully up to date.

SUMMARY OF THE INVENTION

Methods, apparatus, and products for administering power supplies in a data center are disclosed that include power supplies providing power to one or more computing devices, each power supply connected through a power line to one of a plurality of circuit breakers, each circuit breaker including a circuit breaker communications device, each power supply including a power supply communications device, each power supply connected through an out-of-band communications link to a management module, the management module managing the power supplies and the computing devices in the data center.

The methods, apparatus, and products also include, upon connection of a first power supply through a power line to a circuit breaker in the data center, querying, by a power supply communications device of the first power supply through the power line, a circuit breaker communications device of the circuit breaker for a circuit breaker identification, the circuit breaker identification uniquely identifying the circuit breaker; querying, by the power supply communications device of the first power supply, for a maximum current threshold for the circuit breaker; sending, by the power supply communications device through the out-of-band communications link, the circuit breaker identification and the maximum current threshold for the circuit breaker to the management module; and determining, by the management module in dependence upon the circuit breaker identification and the maximum current threshold for the circuit breaker, whether to power on a computing device powered by the first power supply including determining whether the circuit breaker is shared by another power supply.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

Figure 5:
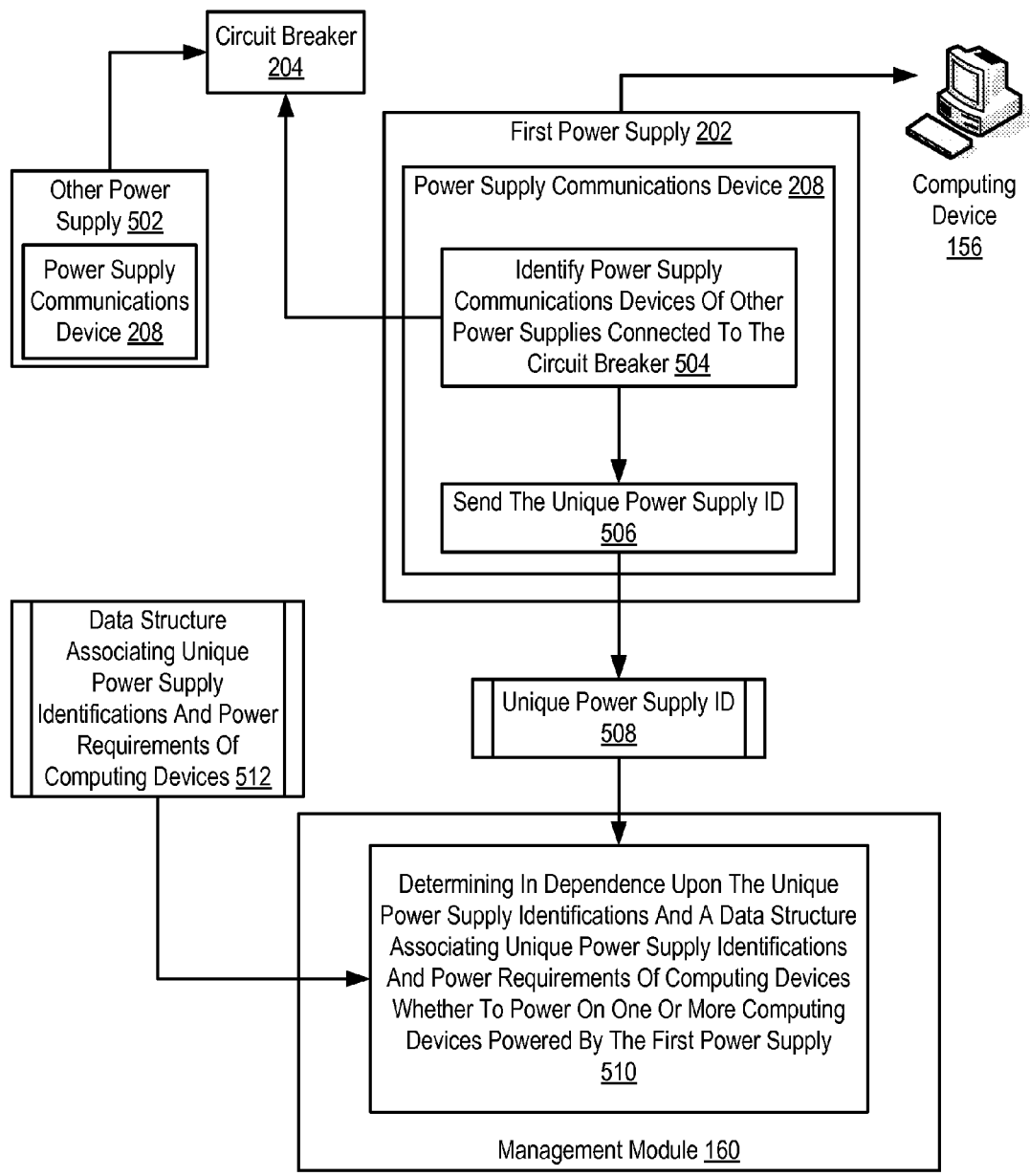

The method of FIG. 5 sets forth a flow chart illustrating a further exemplary method for administering power supplies in a data center according to embodiments of the present invention

DETAILED DESCRIPTION OF EXEMPLARY EMBODIMENTS

Figure 1:
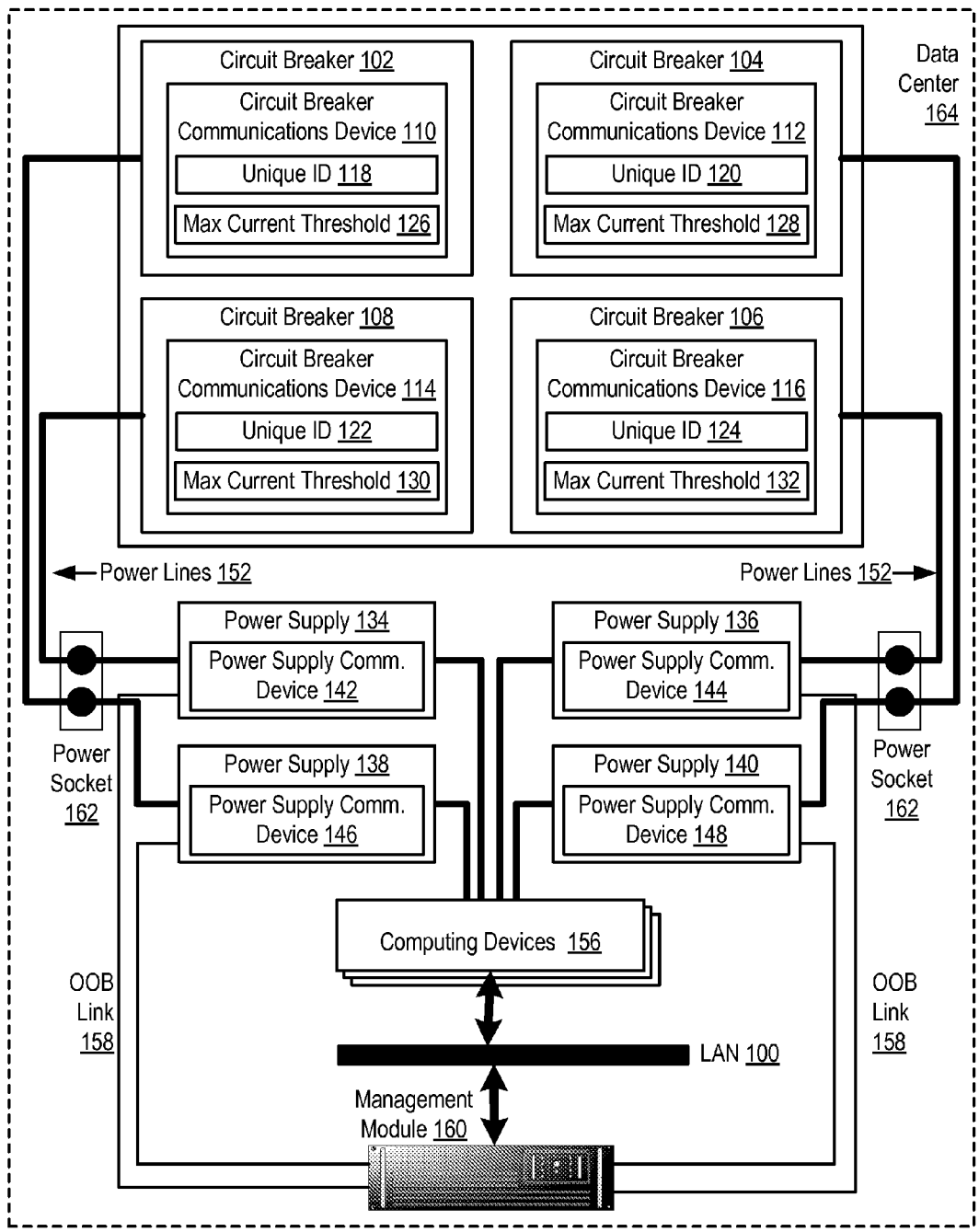
FIG. 1 sets forth a functional block diagram of an exemplary system for administering power supplies in a data center according to embodiments of the present invention.

Exemplary methods, apparatus, and products for administering power supplies in a data center in accordance with the present invention are described with reference to the accompanying drawings, beginning with FIG. 1. FIG. 1 sets forth a functional block diagram of an exemplary system for administering power supplies in a data center (164) according to embodiments of the present invention. The data center (164) is a facility used to house mission critical computer systems and associated components. Such a data center includes environmental controls (air conditioning, fire suppression, etc.), redundant/backup power supplies, redundant data communications connections, and high security, highlighted by biometric access controls to compartmentalized security zones within the facility. A data center is a facility used for housing a large amount of electronic equipment, typically computers and communications equipment. A data center is maintained by an organization for the purpose of handling the data necessary for its operations. A bank, for example, may have a data center, where all its customers' account information is maintained and transactions involving these accounts are carried out. Practically every company that is mid-sized or larger has some kind of data center with the larger companies often having dozens of data centers.

The data center (164) in the example of FIG. 1 includes several computing devices (156) powered by several power supplies (134,136,138,140). Computing devices useful in systems that administer power supplies in a data center in accordance with embodiments of the present invention may include any type of automated computing machinery, such as for example, blade servers.

A server, as the term is used in this specification, refers generally to a multi-user computer that provides a service (e.g. database access, file transfer, remote access) or resources (e.g. file space) over a network connection. The term 'server,' as context requires, refers inclusively to the server's computer hardware as well as any server application software or operating system software running on the server. A server application is an application program that accepts connections in order to service requests from users by sending back responses. A server application can run on the same computer as the client application using it, or a server application can accept connections through a computer network. Examples of server applications include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on.

Blade servers are self-contained servers, designed for high density. A blade enclosure provides services such as power, cooling, networking, various interconnects and management—though different blade providers have differing principles around what should and should not be included in the blade itself—and sometimes in the enclosure altogether. Together, a set of blade servers installed in a blade enclosure or 'blade center' for a blade system. As a practical matter, all computers are implemented with electrical components requiring power that produces heat. Components such as processors, memory, hard drives, power supplies, storage and network connections, keyboards, video components, a mouse, and so on, merely support the basic computing function, yet they all add bulk, heat, complexity, and moving parts that are more prone to failure than solid-state components. In the blade paradigm, most of these functions are removed from the blade computer, being either provided by the blade enclosure (DC power) virtualized (iSCSI storage, remote console over IP), or discarded entirely (serial ports). The blade itself becomes simpler, smaller, and amenable to dense installation with many blade servers in a single blade enclosure.

The data center (164) of FIG. 1 also includes a management module (160). A management module is an aggregation of computer hardware and software that is installed in a data center to provide support services for computing devices, such as blade servers. Support services provided by the management module (164) include monitoring health of computing devices and reporting health statistics to a system management server, power management and power control, save and restore configurations, discovery of available computing devices, event log management, memory management, and so on. An example of a management module that can be used in systems for administering power supplies according to embodiments of the present invention is IBM's Advanced Management Module ('AMM').

The management module is connected for data communications to the computing devices through a local area network ('LAN') (100). The LAN may be implemented as an Ethernet, an IP (Internet Protocol) network, or the like. The management module is also connected to the power supplies through an out-of-band communications link. Such an out-of-band communications link may be implemented as an Inter-Integrated Circuit ('I²C') bus, a System Management Bus ('SMBus'), an Intelligent Platform Management Bus ('IPMB'), or the like.

As mentioned above the computing devices (156) in the example of FIG. 1 are powered by a number of power supplies (134,136,138,14). Each power supply in the example of FIG. 1 is connected through a power socket (162) and a power line (152) to one of several circuit breakers (102,104,106,108). Each of the circuit breakers (102,104,106,108) in the exemplary data center (164) of FIG. 1 are characterized by a circuit breaker identification (118,120,122,124) uniquely identifying the circuit breaker and a maximum current threshold (126,128,130,132). A circuit breaker is automatically-operated electrical switch designed to protect an electrical circuit from damage caused by overload or short circuit. Unlike a fuse, which operates once and then has to be replaced, a circuit breaker can be reset, either manually or automatically, to resume normal operation after being tripped.

Each circuit breaker (102,104,106,108) in the example of FIG. 1 also includes a circuit breaker communications device (110,112,114,116). Likewise, each power supply (134,136, 138,140) in the example of FIG. 1 includes a power supply communications device (142,144,146,148). A 'communications device' as the term is used in this specification is an aggregation of hardware and software that communicates with other devices via power lines. In this example the power supply communications devices and the circuit breaker communications devices are capable of communicating through the power lines (152). Power line communication ('PLC'), power line carrier, mains communication, power line telecom ('PLT'), and power line networking ('PLN'), are terms describing several different systems for using electric power lines to carry information over a power line. There are several competing standards for power line communication including the HomePlug Powerline Alliance, Universal Powerline Association, ETSI, and the IEEE. X10 is a de facto standard also used by RadioShack's Plug'n'Power system.

Communication devices useful in systems for administering power supplies in a data center may be implemented as INSTEON™ devices. Insteon is a home automation networking technology invented by SmartLabs, Inc., owner of Smarthome. Insteon is a robust, redundant dual-mesh network that combines wireless radio frequency (RF) with the existing electrical wiring, such as power lines. Insteon was originally developed for control and sensing applications in a home environment. Examples of typically applications of Insteon technologies include remote control lighting, HVAC, sprinklers, access control and so on. Insteon enables low-cost devices to be networked in a peer-to-peer network through the power line, radio frequencies ('RF'), or both. All Insteon devices in an Insteon network are peers, meaning that any device can transmit, receive, or repeat messages, without requiring a master controller or complex routing software. Adding more devices to an Insteon network makes an Insteon network more robust, by virtue of the Insteon protocol for communication retransmissions and retries.

Upon connection of a first power supply through a power line to a circuit breaker in the data center, the system of FIG. 1 operates generally for administering power supplies in the data center (164) by querying, by a power supply communications device of the first power supply through the power line, a circuit breaker communications device of the circuit breaker for a circuit breaker identification, the circuit breaker identification uniquely identifying the circuit breaker. Assume for purposes of explanation only that the power supply (134) is the first power supply. As such, the first power supply communications device (142) will query, through the power line (152), the circuit breaker communications device (114) for the circuit breaker identification (122) upon connection of the power supply (134) to the circuit breaker (108). When the communications devices are implemented as Insteon devices the circuit breaker identification that uniquely identifies the circuit breaker may be the Insteon identification assigned to the circuit breaker communications device. All Insteon devices are assigned a permanent unique 24-bit address to assist in messaging between devices in an Insteon network. In this way, Insteon devices may be added to a network as a peer without the need for virtualized addresses, complex routing tables, or the like.

The system of FIG. 1 also operates generally for administering power supplies in the data center (164) by querying, by the power supply communications device (142) of the first power supply (134), for a maximum current threshold (130) for the circuit breaker (108). Different circuit breakers are designed with varying maximum current thresholds. A maximum current threshold, also called rated current, is the maximum current which the breaker is designed to carry continuously before being tripped. Although the communications device (142) of the first power supply (134) is described here as querying for only a single type of information, the maximum current threshold, readers of skill in the art will recognize that power supply communications device may query the circuit breaker communications devices for any other types of information such as, for example, a maximum voltage rating of the circuit breaker and the like.

The system of FIG. 1 also operates generally for administering power supplies in the data center (164) by sending, by the power supply communications device (142) through the out-of-band communications link (158), the circuit breaker identification (122) and the maximum current threshold (130) for the circuit breaker (108) to the management module (160), and determining, by the management module (160) in dependence upon the circuit breaker identification (122) and the maximum current threshold (126) for the circuit breaker (108), whether to power on a computing device (156) powered by the first power supply (134). Determining whether to power on a computing device may also include determining whether the circuit breaker is shared by another power supply. When more than one power supply's power line is connected to the same circuit breaker the power supplies connected to the same circuit breaker are said to be sharing the circuit breaker. The greater the number of power supplies that share a single circuit breaker the greater the possibility of tripping the circuit breaker.

The arrangement of servers, power supplies, circuit breakers, and other devices making up the exemplary system illustrated in FIG. 1 are for explanation, not for limitation. Data centers useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
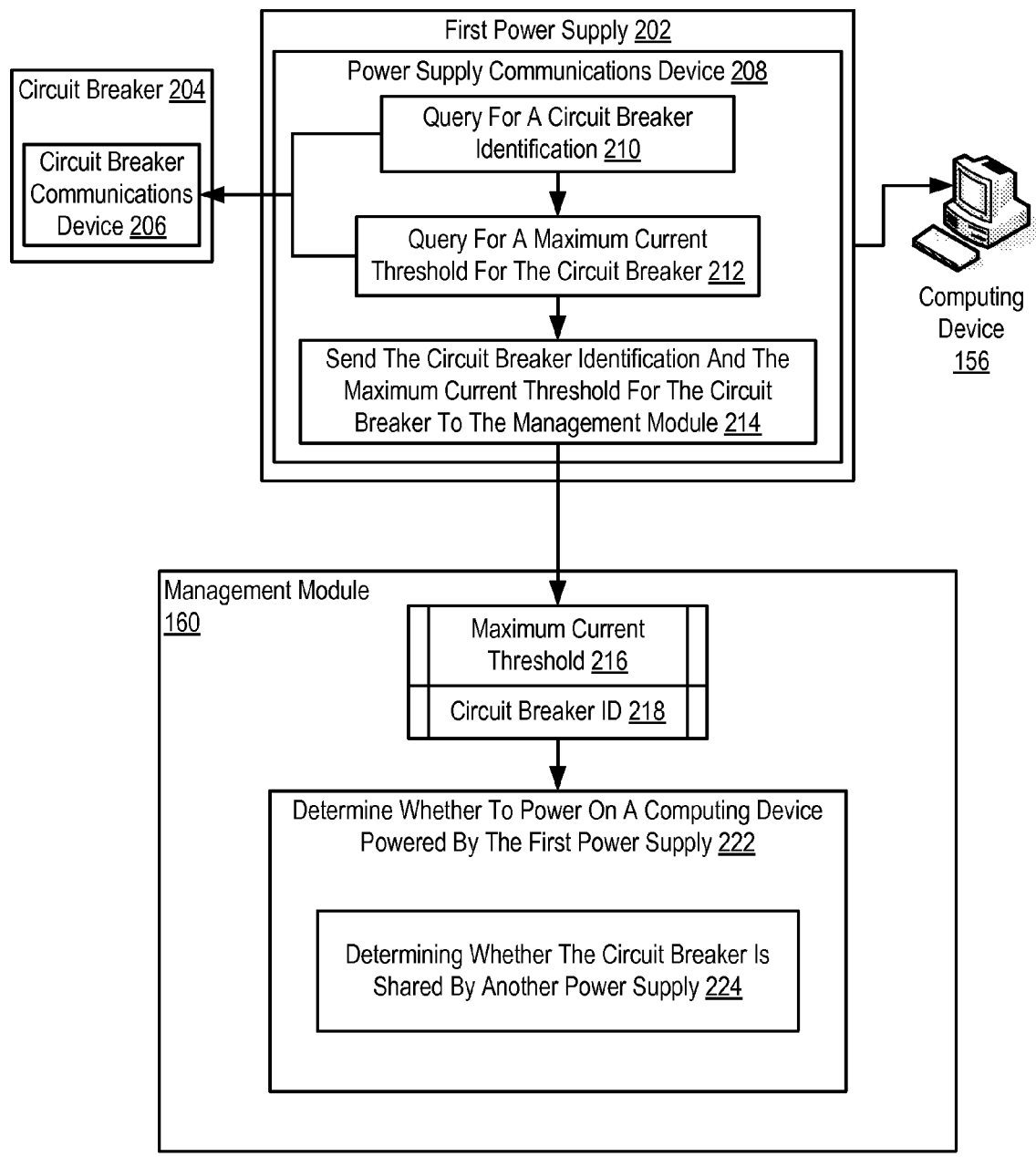
FIG. 2 sets forth a flow chart illustrating an exemplary method for administering power supplies in a data center according to embodiments of the present invention.

For further explanation, FIG. 2 sets forth a flow chart illustrating an exemplary method for administering power supplies in a data center according to embodiments of the present invention. In the method of FIG. 2 the power supplies provide power to one or more computing devices, each power supply is connected through a power line to one of several circuit breakers. Each circuit breaker in the method of FIG. 2 includes a circuit breaker communications device and each power supply includes a power supply communications device. Each power supply in the example of FIG. 2 is connected through an out-of-band communications link to a management module (160). The management module (160) manages the power supplies and the computing devices in the data center.

Upon connection of a first power supply (202) through a power line to a circuit breaker (204) in the data center, the method of FIG. 2 includes querying (210), by a power supply communications device (208) of the first power supply (202) through the power line, a circuit breaker communications device (206) of the circuit breaker (204) for a circuit breaker identification (218), the circuit breaker identification (218) uniquely identifying the circuit breaker (204). querying (210), by a power supply communications device (208) of the first power supply (202) through the power line, a circuit breaker communications device (206) of the circuit breaker (204) for a circuit breaker identification (218) may be carried out by broadcasting, only through the power supply's power line connection, a message to all listening peers requesting an identification of the peers. Insteon devices when added to an Insteon network, for example, typically retrieve all device identifications of devices within the network and store such identifications in a table for later communications. Because the only listening peer possible through the power line in this configuration is a circuit breaker communications device, the power supply will typically retrieve through the broadcast query only the circuit breaker's identification.

The method of FIG. 2 also includes querying (212), by the power supply communications device (208) of the first power supply (202), for a maximum current threshold (216) for the circuit breaker (204). In the method of FIG. 2 querying (212) for a maximum current threshold (216) may be carried out by querying the circuit breaker communications device for the maximum current threshold over radio frequencies ('RF'). As mentioned above, Insteon devices can communicate with one another over the power line or over RF or both. Once the power supply communications device identifies the particular circuit breaker communications device through the power line, the power supply communications device may send a query to the particular circuit breaker communications device by using the device's unique identification. In this way, even if multiple circuit breaker communications devices are near enough to communicate via RF they query is directed to the correct circuit breaker communications device. Once the power supply communications device receives the circuit breaker identification and the maximum current threshold for the circuit breaker, the method of FIG. 2 proceeds by sending (214), by the power supply communications device (208) through the out-of-band communications link, the circuit breaker identification (218) and the maximum current threshold (216) for the circuit breaker (204) to the management module (160).

The method of FIG. 2 also includes determining (222), by the management module (160) in dependence upon the circuit breaker identification (218) and the maximum current threshold (216) for the circuit breaker (204), whether to power on a computing device powered by the first power supply (202). In the method of FIG. 2 determining (222) whether to power on a computing device powered by the first power supply (202) includes determining (224) whether the circuit breaker (218) is shared by another power supply. Determining whether the circuit breaker is shared by another power supply may be carried out by determining from a data structure associating circuit breaker identifications and power supply identifications whether the circuit breaker identification of the circuit breaker connected to the first power supply is associated with another power supply's identification. Consider the following table as an example of a data structure associating circuit breaker identification and power supplies:

TABLE 1

Data Structure Associating Circuit Breaker
Identifications And Power Supply Identifications

| Circuit Breaker Identifications | Power Supply Identifications |
|---|---|
| A001 | X001 |
| B001 | Y001 |
| B001 | Z001 |

Table 1 above includes several circuit identifications, each associated with a power supply identification. In the example of Table 1 the circuit breaker identified as A001 is connected to a power supply identified as X001. Also in the example of Table 1, the circuit breaker identified as B001 is connected to two power supplies identified as Y001 and Z001. In this example, therefore, the power supplies identified as Y001 and Z001 share the circuit breaker identified as B001. If the first power supply (202) in the method of FIG. 2, for example, is connected to a circuit breaker identified as A001, the circuit breaker is shared with another power supply, the power supply identified as X001. If, however, the first power supply in the method of FIG. 2 is connected to a circuit breaker identified as C001, the management module may determine that the circuit breaker is not shared with another power supply and may add the association of the first power supply and the circuit breaker identified as C001 to Table 1.

Figure 3:
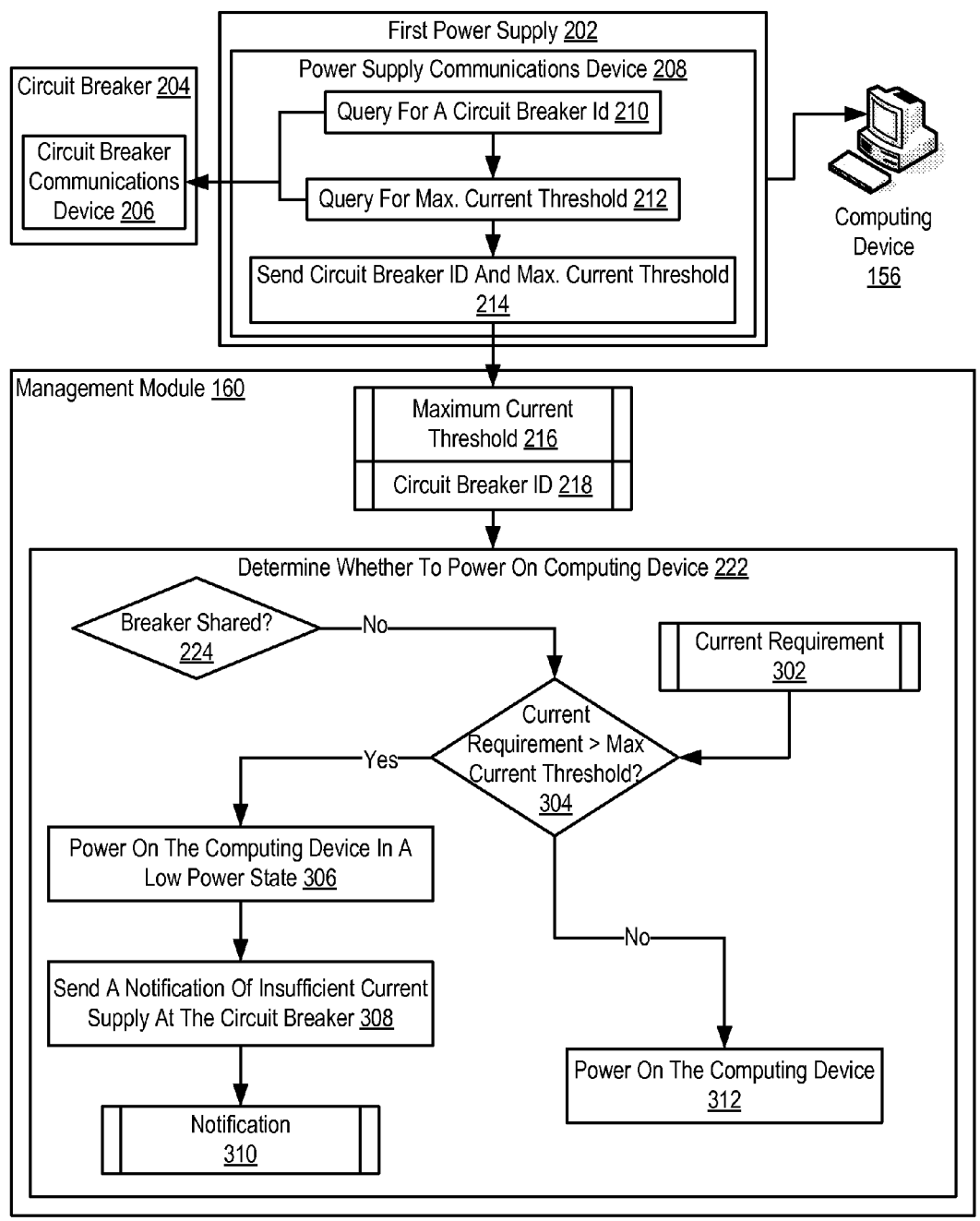
FIG. 3 sets forth a flow chart illustrating a further exemplary method for administering power supplies in a data center according to embodiments of the present invention.

For further explanation, FIG. 3 sets forth a flow chart illustrating a further exemplary method for administering power supplies in a data center according to embodiments of the present invention. The method of FIG. 3 is similar to the method of FIG. 2 in that the method of FIG. 3 also includes querying (210), by a power supply communications device (208) of the first power supply (202) through the power line, a circuit breaker communications device (206) of the circuit breaker (204) for a circuit breaker identification (218), the circuit breaker identification (218) uniquely identifying the circuit breaker (204); querying (212), by the power supply communications device (208) of the first power supply (202), for a maximum current threshold (216) for the circuit breaker (204); sending (214), by the power supply communications device (208) through the out-of-band communications link, the circuit breaker identification (218) and the maximum current threshold (216) for the circuit breaker (204) to the management module (160); and determining (222), by the management module (160) in dependence upon the circuit breaker identification (218) and the maximum current threshold (216) for the circuit breaker (204), whether to power on a computing device powered by the first power supply (202) including determining (224) whether the circuit breaker (218) is shared by another power supply.

The method of FIG. 3 differs from the method of FIG. 2, however, in that in the method of FIG. 3, if the circuit breaker is not shared by another power supply, determining (222) whether to power on a computing device powered by the first power supply (202) includes determining (304) whether a current requirement (302) of the computing device powered by the first power supply (202) exceeds the maximum current threshold (216) of the circuit breaker (204). The management module (160) may be configured with current requirements of all devices managed by the management module in the data center. The current requirements describe the typical amount of current in amperes required by a computing device to operate under normal conditions. If the current requirement of computing device (156) powered by the first power supply (202) exceeds the maximum current threshold (216) of the circuit breaker (204), the circuit breaker may trip when the computing device is powered on.

If the current requirement (302) of the computing device (156) powered by the first power supply (202) exceeds the maximum current threshold (216) of the circuit breaker (204) the method of FIG. 3 continues by powering on (306), by the management module (160), the computing device powered by the first power supply (202) in a low power state and sending (308), by the management module (160) to the computing device powered by the first power supply (202), a notification (310) of insufficient current supply at the circuit breaker. Powering on the computing device in a lower power state may be carried out in various ways including, for example, by powering on internal hardware of the computing device necessary to receive and display the notification (310). Other low power states may include booting the computing device with a lightweight operating system and no software applications that typically execute on the computing device.

Sending a notification to the computing device in the lower power state may be carried out by sending the notification from the management module through a local area network, such as an Ethernet, IP network, or the like. In addition to powering on the computing device in a low power state, the management module (160) may, of course, not power on the computing device at all. If the current requirement (302) of the computing device (156) powered by the first power supply (202) does not exceed the maximum current threshold (216) of the circuit breaker (204), the method of FIG. 3 continues by powering on (312) the computing device powered by the first power supply (202).

Figure 4:
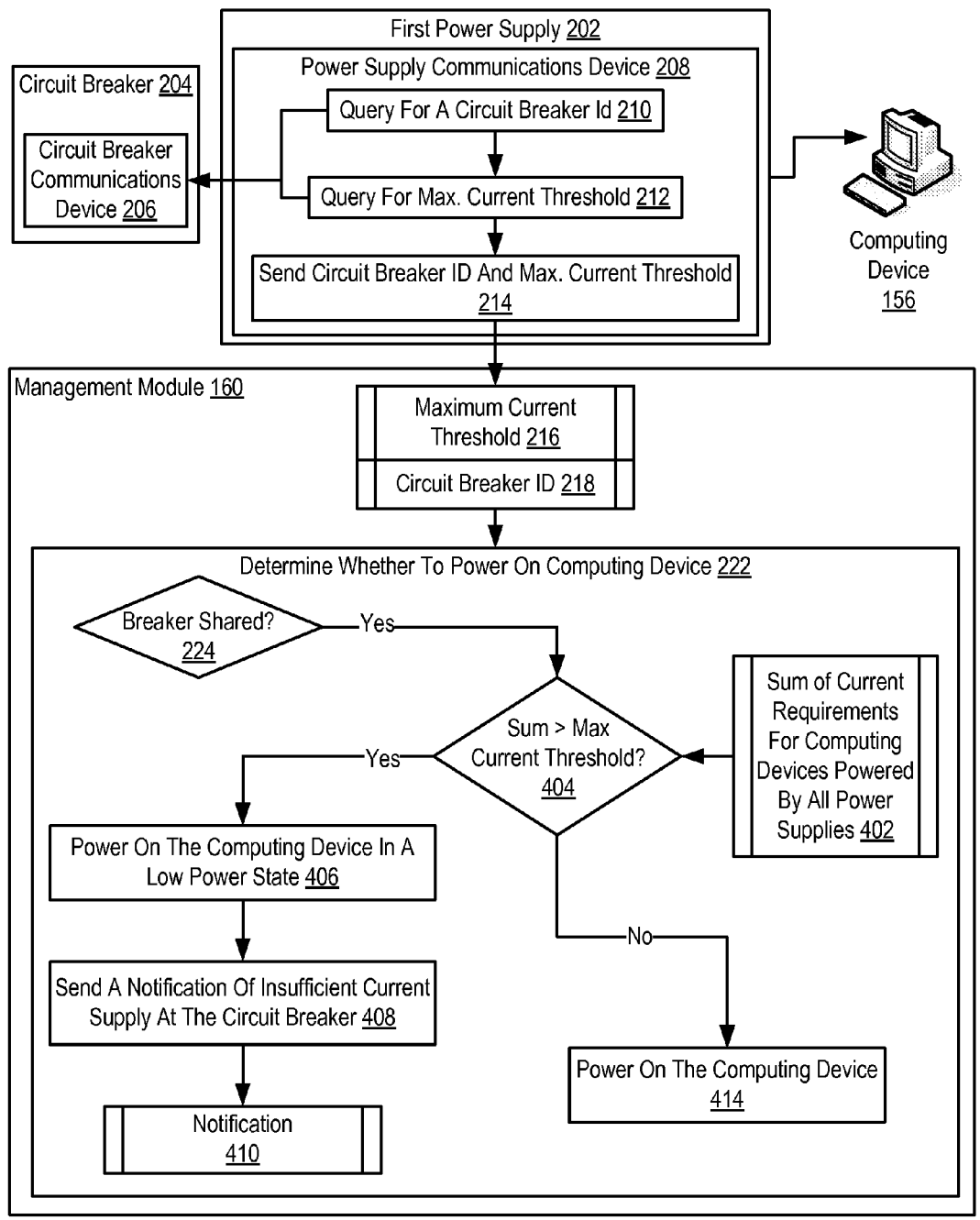
FIG. 4 sets forth a flow chart illustrating a further exemplary method for administering power supplies in a data center according to embodiments of the present invention.

For further explanation, FIG. 4 sets forth a flow chart illustrating a further exemplary method for administering power supplies in a data center according to embodiments of the present invention. The method of FIG. 4 is similar to the method of FIG. 2 in that the method of FIG. 4 also includes querying (210), by a power supply communications device (208) of the first power supply (202) through the power line, a circuit breaker communications device (206) of the circuit breaker (204) for a circuit breaker identification (218), the circuit breaker identification (218) uniquely identifying the circuit breaker (204); querying (212), by the power supply communications device (208) of the first power supply (202), for a maximum current threshold (216) for the circuit breaker (204); sending (214), by the power supply communications device (208) through the out-of-band communications link, the circuit breaker identification (218) and the maximum current threshold (216) for the circuit breaker (204) to the management module (160); and determining (222), by the management module (160) in dependence upon the circuit breaker identification (218) and the maximum current threshold (216) for the circuit breaker (204), whether to power on a computing device powered by the first power supply (202) including determining (224) whether the circuit breaker (218) is shared by another power supply.

The method of FIG. 4 differs from the method of FIG. 3, however, in that in the method of FIG. 4, if the circuit breaker is shared by another power supply, determining (222) whether to power on a computing device (156) powered by the first power supply (202) includes determining (404) whether a sum (402) of current requirements of computing devices powered by all power supplies sharing the circuit breaker exceeds the maximum current threshold (216) of the circuit breaker (204). As mentioned above, management modules useful for administering power supplies in a data center in accordance with embodiments of the present invention may be configured with current requirements of computing devices powered by power supplies as well as a data structure associating circuit breaker identifications and power supply identifications. Once the management module determines that the circuit breaker is shared, the management module may sum the current requirements of the computing devices powered by all power supplies that share the circuit breaker. Once the management module sums the current requirements, the management module may compare that sum to the maximum current threshold of the circuit breaker. Instead of summing the current requirements of all computing devices powered by all power supplies sharing the circuit breaker, the management module may alternatively sum only the current requirements of those computing device currently powered on that are powered by the power supplies sharing the circuit breaker.

If the sum (402) of the current requirements of computing devices powered by all power supplies sharing the circuit breaker exceeds the maximum current threshold (216) of the circuit breaker (204), the method of FIG. 4 continues by powering on (406), by the management module (160), the computing device (156) powered by the first power supply (202) in a low power state and sending (408), by the management module (160) to the computing device (156) powered by the first power supply (202), a notification (410) of insufficient current supply at the circuit breaker. If the sum (402) of the current requirements of the computing devices powered by all power supplies sharing the circuit breaker does not exceed the maximum current threshold (216) of the circuit breaker (204), the method of FIG. 4 continues by powering on (414), by the management module (160), the computing device (156) powered by the first power supply (202).

In addition to those methods described above with respect to FIG. 2, FIG. 3, and FIG. 4 there is an alternative method of administering power supplies in a data center in accordance with embodiments of the present invention. The method of FIG. 5, therefore, sets forth a flow chart illustrating a further exemplary method for administering power supplies in a data center according to embodiments of the present invention.

The method of FIG. 5 is similar to the method of FIG. 2, in that in the method of FIG. 5, each of the power supplies providing power to one or more computing devices is connected through a power line to one of several circuit breakers, each power supply includes a power supply communications device, each power supply is connected through an out-of-band communications link to a management module, and the management module manages the power supplies and the computing devices in the data center. The method of FIG. 5 differs from the method of FIG. 2 in that in the method of FIG. 5 the circuit breakers (204) do not include circuit breaker communications devices and upon connection of a first power supply (202) through a power line to a circuit breaker (204) in the data center, the method of FIG. 5 includes, identifying (504), by a power supply communications device (208) of the first power supply (202) through the power line, power supply communications devices (208) of other power supplies (502) connected to the circuit breaker (204) including retrieving a unique power supply identification (508) for each power supply (502).

The method of FIG. 5 also includes sending (506), by the power supply communications device (208) of the first power supply (202) to the management module (160) through the out-of-band communications link, the unique power supply identification (508) of the identified power supplies (502) and determining (510) in dependence upon the unique power supply identifications (508) and a data structure (512) associating unique power supply identifications and current requirements of computing devices whether to power on one or more computing devices powered by the first power supply (202). Determining whether to power on one or more computing devices powered by the first power supply in the method of FIG. 5 may be carried out by summing the current requirements of all computing devices powered by power supplies sharing the circuit breaker (204) and determining whether the sum exceeds a predetermined threshold.

Exemplary embodiments of the present invention are described largely in the context of a fully functional computer system for administering power supplies in a data center. Readers of skill in the art will recognize, however, that the present invention also may be embodied in a computer program product disposed on computer readable signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of administering power supplies in a data center, the power supplies providing power to one or more computing devices, each of the power supplies connected through a power line to one of a plurality of circuit breakers, each of the circuit breakers comprising a circuit breaker communications device, each of the powers supplies comprising a power supply communications device, each of the power supplies connected through an out-of-band communications link to a management module, the management module managing the power supplies and the computing devices in the data center, the method comprising:

upon connection of a first power supply of the power supplies through a power line to a circuit breaker of the circuit breakers in the data center, querying, by a power supply communications device of the first power supply through the power line, a circuit breaker communications device of the circuit breaker of the circuit breakers for a circuit breaker identification, the circuit breaker identification uniquely identifying the circuit breaker;

querying, by the power supply communications device of the first power supply, for a maximum current threshold for the circuit breaker;

sending, by the power supply communications device through the out-of-band communications link, the circuit breaker identification and the maximum current threshold for the circuit breaker to the management module;

determining, by the management module in dependence upon the circuit breaker identification and the maximum current threshold for the circuit breaker, whether to power on a computing device of the computing devices powered by the first power supply including determining whether the circuit breaker is shared by another power supply of the power supplies; and administering power of the computing device powered by the first power supply in accordance with the determination whether to power on the computing device.

2. The method of claim 1 wherein, if the circuit breaker is not shared by the another power supply, determining whether to power on the computing device powered by the first power supply further comprises determining whether a current requirement of the computing device powered by the first power supply exceeds the maximum current threshold of the circuit breaker, the method further comprising:

if the current requirement of the computing device powered by the first power supply exceeds the maximum current threshold of the circuit breaker:

powering on, by the management module, the computing device powered by the first power supply in a low power state;

sending, by the management module to the computing device powered by the first power supply, a notification of insufficient current supply at the circuit breaker; and if the current requirement of the computing device powered by the first power supply does not exceed the maximum current threshold of the circuit breaker, powering on, by the management module, the computing device powered by the first power supply.

3. The method of claim 1 wherein, if the circuit breaker is shared by the another power supply, determining whether to power on the computing device powered by the first power supply further comprises determining whether a sum of current requirements of the computing devices powered by all of the power supplies sharing the circuit breaker exceeds the maximum current threshold of the circuit breaker, the method further comprising:

if the sum of the current requirements of the computing devices powered by all of the power supplies sharing the circuit breaker exceeds the maximum current threshold of the circuit breaker:

powering on, by the management module, the computing device powered by the first power supply in a low power state;

sending, by the management module to the computing device powered by the first power supply, a notification of insufficient current supply at the circuit breaker; and if the sum of the current requirements of the computing devices powered by all of the power supplies sharing the circuit breaker does not exceed the maximum current threshold of the circuit breaker, powering on, by the management module, the computing device powered by the first power supply.

4. The method of claim 1 wherein determining whether the circuit breaker is shared by the another power supply further comprises:

determining from a data structure associating circuit breaker identifications and power supply identifications whether the circuit breaker identification of the circuit breaker connected to the first power supply is associated with the another power supply's identification.

5. The method of claim 1 wherein querying, by the power supply communications device of the first power supply, the circuit breaker communications device for the maximum current threshold for the circuit breaker further comprises:

querying the circuit breaker communications device for the maximum current threshold over radio frequencies ('RF').

6. The method of claim 1 wherein the circuit breaker communications device of the circuit breaker connected to the first power supply and the power supply communications device of the first power supply are data communications peers in a peer-to-peer data communications network topology.

7. An apparatus for administering power supplies in a data center, the power supplies providing power to one or more computing devices, each of the power supplies connected through a power line to one of a plurality of circuit breakers, each of the circuit breakers comprising a circuit breaker communications device, each of the power supplies each power supply comprising a power supply communications device, each of the power supplies each power supply connected through an out-of-band communications link to a management module, the management module managing the power supplies and the computing devices in the data center, the apparatus comprising a computer processor, a computer memory operatively coupled to the computer processor, the computer memory having disposed within it computer program instructions capable of:

upon connection of a first power supply of the power supplies through a power line to a circuit breaker of the circuit breakers in the data center, querying, by a power supply communications device of the first power supply through the power line, a circuit breaker communications device of the circuit breaker for a circuit breaker identification, the circuit breaker identification uniquely identifying the circuit breaker;

querying, by the power supply communications device of the first power supply, for a maximum current threshold for the circuit breaker;

sending, by the power supply communications device through the out-of-band communications link, the circuit breaker identification and the maximum current threshold for the circuit breaker to the management module; and determining, by the management module in dependence upon the circuit breaker identification and the maximum current threshold for the circuit breaker, whether to power on a computing device of the computing devices powered by the first power supply including determining whether the circuit breaker is shared by another power supply of the power supplies; and administering power of the computing device powered by the first power supply in accordance with the determination whether to power on the computing device.

8. The apparatus of claim 7 wherein, if the circuit breaker is not shared by the another power supply, determining whether to power on the computing device powered by the first power supply further comprises determining whether a current requirement of the computing device powered by the first power supply exceeds the maximum current threshold of the circuit breaker, the apparatus further comprising computer program instructions capable of:

if the current requirement of the computing device powered by the first power supply exceeds the maximum current threshold of the circuit breaker:

powering on, by the management module, the computing device powered by the first power supply in a low power state;

sending, by the management module to the computing device powered by the first power supply, a notification of insufficient current supply at the circuit breaker; and if the current requirement of the computing device powered by the first power supply does not exceed the maximum current threshold of the circuit breaker, powering on, by the management module, the computing device powered by the first power supply.

9. The apparatus of claim 7 wherein, if the circuit breaker is shared by the another power supply, determining whether to power on the computing device powered by the first power supply further comprises determining whether a sum of current requirements of the computing devices powered by all of the power supplies sharing the circuit breaker exceeds the maximum current threshold of the circuit breaker, the apparatus further comprising computer program instructions capable of:

if the sum of the current requirements of the computing devices powered by all of the power supplies sharing the circuit breaker exceeds the maximum current threshold of the circuit breaker:

powering on, by the management module, the computing device powered by the first power supply in a low power state;

sending, by the management module to the computing device powered by the first power supply, a notification of insufficient current supply at the circuit breaker; and if the sum of the current requirements of the computing devices powered by all of the power supplies sharing the circuit breaker does not exceed the maximum current threshold of the circuit breaker, powering on, by the management module, the computing device powered by the first power supply.

10. The apparatus of claim 7 wherein determining whether the circuit breaker is shared by the another power supply further comprises:

determining from a data structure associating circuit breaker identifications and power supply identifications whether the circuit breaker identification of the circuit breaker connected to the first power supply is associated with the another power supply's identification.

11. The apparatus of claim 7 wherein querying, by the power supply communications device of the first power supply, the circuit breaker communications device for the current threshold for the circuit breaker further comprises:

querying the circuit breaker communications device for the maximum current threshold over radio frequencies ('RF').

12. The apparatus of claim 7 wherein the circuit breaker communications device of the circuit breaker connected to the first power supply and the power supply communications device of the first power supply are data communications peers in a peer-to-peer data communications network topology.

13. A computer program product for administering power supplies in a data center, the power supplies providing power to one or more computing devices, each of the power supplies connected through a power line to one of a plurality of circuit breakers, each of the circuit breakers comprising a circuit breaker communications device, each of the power supplies comprising a power supply communications device, each of the power supplies connected through an out-of-band communications link to a management module, the management module managing the power supplies and the computing devices in the data center, the computer program product stored in a computer readable non-transmitting recordable medium, the computer program product comprising computer program instructions capable of:

upon connection of a first power supply of the power supplies through a power line to a circuit breaker of the circuit breakers in the data center, querying, by a power supply communications device of the first power supply through the power line, a circuit breaker communications device of the circuit breaker for a circuit breaker identification, the circuit breaker identification uniquely identifying the circuit breaker;

querying, by the power supply communications device of the first power supply of the power supplies, for a maximum current threshold for the circuit breaker;

sending, by the power supply communications device through the out-of-band communications link, the circuit breaker identification and the maximum current threshold for the circuit breaker to the management module; and determining, by the management module in dependence upon the circuit breaker identification and the maximum current threshold for the circuit breaker, whether to power on a computing device of the computing devices powered by the first power supply including determining whether the circuit breaker is shared by another power supply of the power supplies; and administering power of the computing device powered by the first power supply in accordance with the determination whether to power on the computing device.

14. The computer program product of claim 13 wherein, if the circuit breaker is not shared by the another power supply, determining whether to power on the computing device powered by the first power supply further comprises determining whether a current requirement of the computing device powered by the first power supply exceeds the maximum current threshold of the circuit breaker, the computer program product further comprising computer program instructions capable of:

if the current requirement of the computing device powered by the first power supply exceeds the maximum current threshold of the circuit breaker:

powering on, by the management module, the computing device powered by the first power supply in a low power state;

sending, by the management module to the computing device powered by the first power supply, a notification of insufficient current supply at the circuit breaker; and if the current requirement of the computing device powered by the first power supply does not exceed the maximum current threshold of the circuit breaker, powering on, by the management module, the computing device powered by the first power supply.

15. The computer program product of claim 13 wherein, if the circuit breaker is shared by the another power supply, determining whether to power on the computing device powered by the first power supply further comprises determining whether a sum of current requirements of the computing devices powered by all of the power supplies sharing the circuit breaker exceeds the maximum current threshold of the circuit breaker, the computer program product further comprising computer program instructions capable of:

if the sum of the current requirements of the computing devices powered by all of the power supplies sharing the circuit breaker exceeds the maximum current threshold of the circuit breaker:

powering on, by the management module, the computing device powered by the first power supply in a low power state;

sending, by the management module to the computing device powered by the first power supply, a notification of insufficient current supply at the circuit breaker; and if the sum of the current requirements of the computing devices powered by all power supplies sharing the circuit breaker does not exceed the maximum current threshold of the circuit breaker, powering on, by the management module, the computing device powered by the first power supply.

16. The computer program product of claim 13 wherein determining whether the circuit breaker is shared by the another power supply further comprises:

determining from a data structure associating circuit breaker identifications and power supply identifications whether the circuit breaker identification of the circuit breaker connected to the first power supply is associated with the another power supply's identification.

17. The computer program product of claim 13 wherein querying, by the power supply communications device of the first power supply, the circuit breaker communications device for the maximum current threshold for the circuit breaker further comprises:

querying the circuit breaker communications device for the maximum current threshold over radio frequencies ('RF').

18. The computer program product of claim 13 wherein the circuit breaker communications device of the circuit breaker connected to the first power supply and the power supply communications device of the first power supply are data communications peers in a peer-to-peer data communications network topology.

19. A method of administering power supplies in a data center, the power supplies providing power to one or more computing devices, each of the power supplies connected through a power line to one of a plurality of circuit breakers, each of the power supplies comprising a power supply communications device, each of the power supplies connected through an out-of-band communications link to a management module, the management module managing the power supplies and the computing devices in the data center, the method comprising:

upon connection of a first power supply of the power supplies through a power line to a circuit breaker of the circuit breakers in the data center, identifying, by a power supply communications device of the first power supply through the power line, power supply communications devices of other power supplies connected to the circuit breaker including retrieving a unique power supply identification for each of the power supplies;

sending, by the power supply communications device of the first power supply to the management module through the out-of-band communications link, the unique power supply identification of the identified power supplies; and determining in dependence upon the unique power supply identifications and a data structure associating the unique power supply identifications and current requirements of computing devices whether to power on one or more computing devices powered by the first power supply.

* * * * *